Jan. 5, 1932. C. H. SMOOT 1,839,710
VALVE FOR HIGH PRESSURE FLUIDS
Filed Jan. 21, 1928

INVENTOR
Charles H. Smoot
BY
ATTORNEYS

Patented Jan. 5, 1932

1,839,710

UNITED STATES PATENT OFFICE

CHARLES H. SMOOT, OF MAPLEWOOD, NEW JERSEY

VALVE FOR HIGH PRESSURE FLUIDS

Application filed January 21, 1928. Serial No. 248,301.

My invention is a novel valve devised to satisfactorily meet the high pressure superheated steam requirements of the modern power station. Valves used for the purpose of controlling the passage of high pressure superheated steam develop steam cut leaks and have a short effective life. My novel valve is one in which the conformation of the surfaces of its members is such with relation to each other and to the direction of movement of the valve that the highest steam velocity is away from the seating surfaces and shifts with every different opening of the valve. The arrangement of surfaces is such that the steam flowing from the low velocity chamber at one side of the valve opening to the low velocity chamber at the other side of the valve is in a passage having smooth stream line walls which present no angles. Eddying with resulting erosion is thus prevented. During use of the valve a film of relatively slow moving steam clings by surface friction to the walls of the opening and protects its surfaces.

The construction of the valve opening is such that there is a graduated increase of area with lift. The valve is equivalent to a small valve when nearly closed and gradually increases in equivalent size to full-open position, thus permitting of a wide range of usefulness.

Figure 1:
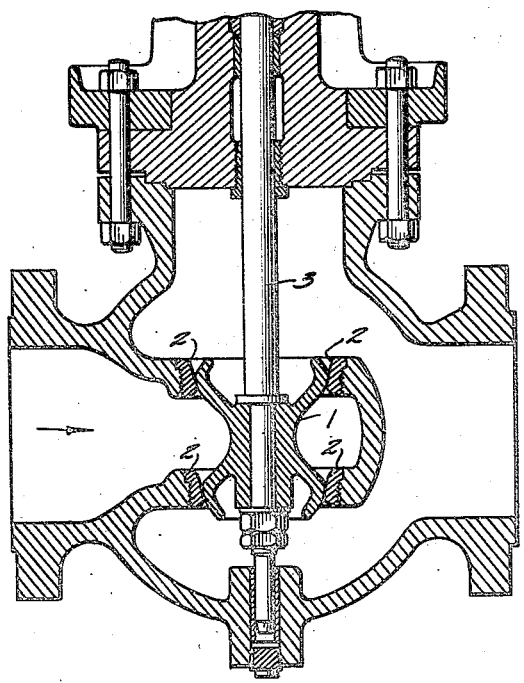
Figure 2:
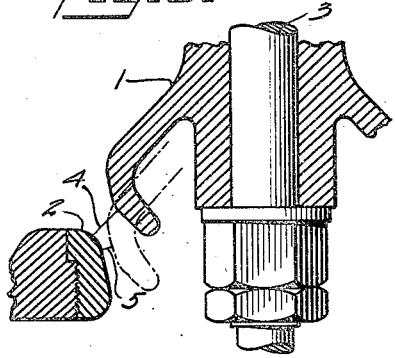

My novel valve structure will be better understood by reference to the drawings in which Fig. 1 is a sectional view showing a balanced valve constructed according to my invention and Fig. 2 illustrates an enlarged detail of a part thereof, also in section.

Referring to the drawings, a balanced valve head is indicated at 1 with valve seats at 2 and stem at 3. The valve is shown in the closed position in Fig. 1 and in open position in Fig. 2. The dotted lines in Fig. 2 indicate a partially closed position. From Fig. 2 it will be apparent that, in the open position of the valve, the parts of the surfaces subjected to the highest steam velocities will be those at which the line 4 terminates, as the line 4 indicates the position of the least area of passage for the steam, whereas in the partially closed position shown in dotted lines, the parts of the surfaces subjected to the highest steam velocities will be those at which the line 5 terminates. Thus, as the valve body is gradually raised the parts of the surface of the seat exposed to the highest temperature shifts upward whereas the corresponding parts of the surface of the valve body shift downward. This feature of my structure is of decided advantage as it insures greater ability to withstand wear. The curvature of the surfaces of the seat and valve members is clearly shown in the drawings as continuing a sufficient distance from each side of the seating portion of the surfaces to effect stream line surfaces connecting the low velocity areas on opposite sides of the valve thus insuring a smooth flow of steam through the passages of the valve when opened to any extent so that there is no eddying of the steam to interfere with relatively slow moving steam clinging to the surfaces and protecting them from erosion.

I prefer to make the valve body of special cast steel with the valve stem and seat of stainless steel as these materials have been found to make a very satisfactory valve. The particular materials used for the valve parts, however, are immaterial to my invention which is concerned primarily with the conformation of the surfaces on each side of the seating portion of the valve and with relation to their movement during the operation of the valve.

I claim:

1. In a throttling valve for controlling the passage of high pressure fluids, a seat with curved surfaces on each side of its seating portion, a movable valve body with curved surfaces on each side of its seating portion, said surfaces being related to each other and to the permissible direction of motion of said valve body to expose different parts of said surfaces to the highest velocities of the fluid flowing therebetween for each different opening of the valve.

2. A throttling valve for controlling the passage of high pressure fluids comprising a seat and a movable valve body each having curved stream line surfaces extending from each side of its seating portion to relatively low velocity zones and so related as to expose different portions to the highest velocities of the fluid flow for each position of the movable valve body.

3. In a throttling valve for controlling the passage of high pressure fluids, a seat, a movable valve body, the surfaces of said seat and said valve body on each side of their seating portions being curved and so related to each other and to the direction of motion of said valve body as to form a passage for the flow of fluid therethrough, said surfaces being so formed that as the valve is progressively opened its section of smallest passage is between progressively shifting portions of surfaces of said seat and valve, one of said portions shifting in the direction of that of opening of the valve and the other in a direction counter to that of opening of the valve.

4. A balanced throttling valve for controlling the passage of high pressure fluids comprising a double seat and a reciprocatable valve body, said seat and valve body each having surfaces curved away from the seating portions to provide stream line passages for the flow of fluid through the valve when open.

5. In a balanced throttling valve for controlling the passage of high pressure fluids, two fixed seating members and a movable valve body, said body comprising a neck portion between two enlarged portions each of which enlarged portions being adapted along part of their surfaces to contact with seating portions of said fixed members when the valve is closed, the surfaces of said fixed members and said enlarged portions of said valve body each being curved away from the seating portions to provide smooth stream line passages for the flow of fluid through the valve when open.

6. A throttling valve controlling the passage of high pressure fluids wherein the fixed and movable members are provided with surfaces conformed to produce stream line passages at all positions of the movable member which passages converge toward and diverge away from the section of smallest passage.

7. A throttling valve controlling the passage of high pressure fluids wherein the fixed and movable members have parallel seating surfaces at a given angle to the direction of movement of the movable member and surfaces at relatively opposite ends thereof curved away from the seating surfaces to gradually shift the section of smallest passage from between the seating surfaces to points on the said curved away surfaces.

8. A throttling valve controlling the passage of high pressure fluids wherein the fixed and movable members have parallel seating surfaces inclined so slightly away from the direction of movement of the movable member as to produce relatively small predetermined changes of valve opening while said surfaces remain adjacent and surfaces curved away from the relatively opposite ends thereof to produce relatively large predetermined changes of valve opening when the seating surfaces are not adjacent.

9. In a throttling valve adapted to control high pressure fluids provided with cooperating surfaces including central parallel seating portions slightly inclined from the direction of movement of the valve and end portions curved away from each other whereby the effective throttling as the valve is opened is first determined by the relatively small separation of the parallel surfaces of the parallel portions and finally by the relatively rapid separation of the curved end portions.

10. In a throttling valve adapted to control the flow of high pressure fluids, a fixed member and a reciprocatable member each having parallel conical seating surfaces and extensions from said conical surfaces curving therefrom, such curving on one member being in an opposite direction to that of the other member, such surfaces being conformed to the direction and extent of movement of the movable member so that the passage of smallest area is between the conical surfaces during the first part of the range of opening movement of the movable member and is gradually shifted to the curved away surfaces.

11. In a throttling valve adapted to control the flow of high pressure fluids, a fixed member and a vertically movable member provided with parallel conical surfaces at a small angle to the vertical, said members having relatively diverging curved surfaces on each side of the conical surfaces, the length of the conical surface portions being such relatively to the range of movement of the movable member that parts of such surfaces remain in the same vertical plane during a substantial portion of said range while all parts of such surfaces are separated horizontally during another substantial portion of said range.

In testimony whereof, I have signed my name to this specification.

CHARLES H. SMOOT.